United States Patent
Kenagy

(10) Patent No.: US 7,984,109 B2
(45) Date of Patent: Jul. 19, 2011

(54) SYSTEM AND METHOD FOR STORING AND ACCESSING DATA FILES AT WIRELESS DEVICES

(75) Inventor: Jason B. Kenagy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1099 days.

(21) Appl. No.: 11/361,158

(22) Filed: Feb. 24, 2006

(65) Prior Publication Data

US 2007/0204224 A1    Aug. 30, 2007

(51) Int. Cl.
*G06F 15/167* (2006.01)
(52) U.S. Cl. ........ 709/215; 709/216; 709/224; 709/225; 726/27; 715/760
(58) Field of Classification Search .................. 709/224, 709/229, 215–216, 225; 726/27–29; 715/760
See application file for complete search history.

(56) References Cited

U.S. PATENT DOCUMENTS

| | | | |
|---|---|---|---|
| 2003/0114190 A1* | 6/2003 | Want et al. | 455/557 |
| 2004/0125782 A1* | 7/2004 | Chang | 370/338 |
| 2004/0127254 A1* | 7/2004 | Chang | 455/557 |
| 2005/0246752 A1* | 11/2005 | Liwerant et al. | 725/109 |
| 2006/0190505 A1* | 8/2006 | DeMaio et al. | 707/204 |
| 2007/0011167 A1* | 1/2007 | Krishnaprasad et al. | 707/9 |
| 2009/0025086 A1* | 1/2009 | Fujita et al. | 726/27 |

* cited by examiner

*Primary Examiner* — Oanh Duong
(74) *Attorney, Agent, or Firm* — James T. Hagler; Robert J. O'Connell

(57) ABSTRACT

A method of providing access to data files within a wireless device is provided and includes detecting a selection of a first user interface component. The first user interface component can be linked to a private portion of the wireless device. Further, the method includes detecting a selection of a second user interface component. The second user interface component can be linked to a public portion of the wireless device. The wireless device includes a keypad and the first user interface component or the second user interface component can be selected using a press and hold keypress sequence on the keypad. When the first user interface component is selected, access is provided to the private portion of the wireless device. Conversely, when the second user interface component is selected, access is provided to the public portion of the wireless device.

52 Claims, 9 Drawing Sheets

SYSTEM AND METHOD FOR STORING AND ACCESSING DATA FILES AT WIRELESS DEVICES

BACKGROUND

I. Field

The present disclosure generally relates to wireless devices. More particularly, the disclosure relates to storing and accessing data files at wireless devices.

II. Description of Related Art

Advances in technology have resulted in smaller and more powerful wireless devices. For example, there currently exist a variety of wireless devices, including mobile phones, personal digital assistants (PDAs), laptops, and paging devices that are small, lightweight, and easily carried by users. These devices may include the ability to transmit voice and/or data over wireless networks. Further, many such wireless devices provide significant computing capabilities, and as such, are becoming tantamount to small personal computers and handheld PDAs.

Typically, these smaller and more powerful wireless devices are often resource constrained. For example, the screen size, the amount of available memory and file system space, and the amount of input and output capabilities may be limited by the small size of the device. Because of such severe resource constraints, it is can be desirable to maintain a limited size and quantity of software applications and other information residing on such wireless devices.

Some of these wireless devices utilize application programming interfaces (APIs) that are sometimes referred to as runtime environments and software platforms. The APIs can be installed onto a wireless device to simplify the operation and programming of such wireless devices by providing generalized calls for device resources. Further, some APIs can provide software developers the ability to create software applications that are executable on such wireless devices. In addition, APIs can provide an interface between a wireless device system hardware and the software applications. As such, the wireless device functionality can be made available to the software applications by allowing the software to make a generic call for a function thus not requiring the developer to tailor its source code to the individual hardware or device on which the software is executing. Further, some APIs can provide mechanisms for secure communications between wireless devices, such as client devices and server systems, using secure cryptographic key information.

Examples of such APIs, some of which are discussed in more detail below, include those currently publicly available versions of the Binary Runtime Environment for Wireless® (BREW®) platform, developed by Qualcomm, Inc. of San Diego, Calif. The BREW® platform can provide one or more interfaces to particular hardware and software features found on wireless devices.

Further, the BREW® platform can be used in an end-to-end software distribution system to provide a variety of benefits for wireless service operators, software developers and wireless device manufacturers and consumers. One such currently available end-to-end software distribution system, called the BREW® solution developed by QUALCOMM Incorporated, includes logic distributed over a server-client architecture, wherein the server can perform billing, security, and application distribution functionality, and wherein the client can perform application execution, security and user interface functionality.

Additionally, data files stored at a wireless device can include a variety of data file types having different end uses. For example, some data files are private and are intended for use by the owner of the portable computer device or others that have been given permission by the owner. Other data files, such as images of friends or family, may be shared freely and desired to be displayed by the owner to others. Conventional, wireless devices treat different data files types in a common manner. It would be advantageous to provide a user with the ability to control and customize the storage, use, and display of different data file types having different purposes.

Accordingly it would be advantageous to provide an improved system and method of storing and accessing data files at wireless devices.

SUMMARY

A method of providing access to data files within a wireless device is provided and includes detecting a selection of a first user interface component. The first user interface component can be linked to a private portion of the wireless device. Further, the method includes detecting a selection of a second user interface component. The second user interface component can be linked to a public portion of the wireless device.

In a particular embodiment, the wireless device includes a keypad and the first user interface component or the second user interface component can be selected using a press and hold keypress sequence on the keypad. Alternatively, the first user interface component or the second user interface component can be selected using a rapid double keypress sequence or any other keypress sequence. When the first user interface component is selected, access is provided to the private portion of the wireless device. Conversely, when the second user interface component is selected, access is provided to the public portion of the wireless device.

In a particular embodiment, a user may be prompted for a password after the first user interface component is selected and access to the private portion may be provided after a correct password is received. Further, access can be provided to one or more private data files or private applications stored within the private portion of the wireless device. When the second user interface component is selected, access may be provided to one or more public data files or public applications that are stored within the public portion of the wireless device.

In a particular embodiment, the public data file, the private data file, or both the public data file and the private data file can be an audio data file, a video data file, or a still image data file. Particularly, the audio data file can be an MPEG audio layer three (MP3) data file, a waveform audio format (WAV) data file, a wma data file, an OGG data file, a Monkey's Audio digital data file (APE) data file, a VOX data file, a Real Audio (RA) data file, a synthetic music mobile application format (MMF) data file, or musical instrument digital interface (MID) data file, a phrase format (SPF) data file, or a Qualcomm PureVoice audio data file (QCP). Also, the video data file can a moving picture experts group (MPEG) data file, an audio video interleave (AVI) data file, a Windows media video (WMV) data file, an advanced streaming format (ASF) data file, a Quicktime (MOV) data file, or a Real Media (RM) data file. Further, the image data file can be a joint photographic experts group (JPEG) data file, a graphics interchange format (GIF) data file, a tagged image data file format (TIEF) data file, an Adobe Photoshop (PSD) data file, a portable networks graphics (PNG) data file, or a windows metadata file (WMF) data file.

In a particular embodiment, the first user interface component can be a voice user interface component, a physical user interface component, a graphical user interface component, or a touch screen user interface component. Also, the second user interface component can be a voice user interface component, a physical user interface component, a graphical user interface component, or a touch screen user interface component. Additionally, the wireless device can be a cellular telephone, a portable digital assistant, and a pager.

In another embodiment, a method of storing data files at a wireless device is provided and includes receiving a data file at the wireless device. A data file type associated with the data file is detected. Also, the data file is stored within a private portion of the wireless device or within a public portion of the wireless device based on the data file type.

In yet another embodiment, a method of storing data files at a wireless device is provided and includes receiving a first data file at a wireless device. A user is queried to determine whether to store the first data file within a private portion of the wireless device or a public portion of the wireless device.

In still another embodiment, a method of processing data files for communication between a first wireless device and a second wireless device is provided and includes establishing a wireless connection between the first wireless device and the second wireless device. The method also includes determining whether the second device is an identified device. Further, the method includes determining whether the second device is a trusted device.

In yet still another embodiment, a wireless device includes a processor and a memory device that is accessible by the processor. Particularly, the memory device includes a private portion and a public portion. The wireless device further includes a first user interface component that is associated with the private portion and a second user interface component that is associated with the public portion.

In another embodiment, a computer program is embedded within a computer readable medium and includes instructions to generate a first user interface component. The first user interface component is associated with a private portion of a wireless device. The computer program also includes instructions to generate a second user interface component. The second user interface component is associated with a public portion of the wireless device. Additionally, the computer program includes instructions to navigate from the private portion of the portable computing to the public portion of the wireless device in response to a selection of the first user interface component. Also, the computer program includes instructions to navigate from the public portion of the portable computing to the private portion of the wireless device in response to a selection of the second user interface component.

In still another embodiment, a computer program is embedded within a computer readable medium and includes instructions to receive a data file at a wireless device, instructions to detect a data file type associated with the data file, and instructions to determine whether to store the data file within a private portion of the wireless device or within a public portion of the wireless device at least partially based on the data file type.

In still yet another embodiment, a computer program is embedded within a computer readable medium and includes instructions to receive a first data file at a wireless device and instructions to query a user and receive a user response to determine whether to store the first data file within a private portion of the wireless device or a public portion of the wireless device.

In another embodiment, a computer program is embedded within a computer readable medium and includes instructions to establish a wireless connection between a first wireless device and a second wireless device, instructions to determine whether the second wireless device is an identified device, and instructions to determine whether the second device is a trusted device.

In another embodiment, a wireless device is provided and includes a processor and a memory device that is accessible by the processor. Particularly, the memory device includes a private portion and a public portion. Also, a computer program is embedded within the memory device and includes instructions to generate a first user interface component and instructions to generate a second user interface component. The first user interface component is linked to a private portion of a wireless device. Moreover, the second user interface component is linked to a public portion of the wireless device. The computer program also includes instructions to navigate from the private portion of the portable computing to the public portion of the wireless device when the first user interface component is selected. Further, the computer program includes instructions to navigate from the public portion of the portable computing to the private portion of the wireless device when the second user interface component is selected.

In yet another embodiment, a wireless device is provided and includes a processor and a memory device that is accessible by the processor. The memory device includes a private portion and a public portion. A data file is received at the wireless device. The wireless device further includes a computer program that is embedded within the memory device. The computer program includes instructions to detect a data file type associated with the data file and instructions to determine whether to store the data file within a private portion of the wireless device or within a public portion of the wireless device at least partially based on the data file type.

In still another embodiment, a wireless device is provided and includes a processor and a memory device that is accessible by the processor. Particularly, the memory device includes a private portion and a public portion. A data file is received at the wireless device. Moreover, a computer program is embedded within the memory device. The computer program includes instructions to query a user on whether to store the first data file within a private portion of the wireless device or a public portion of the wireless device.

In still yet another embodiment, a wireless device is provided and includes a processor and a memory device that is accessible by the processor. In particular, the memory device includes a private portion and a public portion. Also, a computer program is embedded within the memory device. The computer program includes instructions to establish a wireless connection between the first wireless device and the second wireless device, instructions to determine whether the second device is an identified device, and instructions to determine whether the second device is a trusted device.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a wireless device. It will be recognized that various actions described herein could be performed by specific circuits, e.g., application specific integrated circuits (ASICs), by program instructions being executed by one or more processors, or by a combination of both.

Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action. The following detailed description describes methods, systems, software and apparatus used in connection with one or more wireless devices.

In one or more embodiments, a wireless device may utilize a runtime environment, such as a version of the Binary Runtime Environment for Wireless® (BREW®) platform developed by QUALCOMM, Inc., of San Diego, Calif. In at least one embodiment in the following description, the system used to provide communications between wireless devices and servers is implemented on a wireless device executing a runtime environment, such as the current version of the BREW® platform. However, one or more embodiments of the system used to provide communications between wireless devices and servers are suitable for use with other types of runtime environments that, for example, operate to control the execution of applications on wireless devices.

Figure 1:
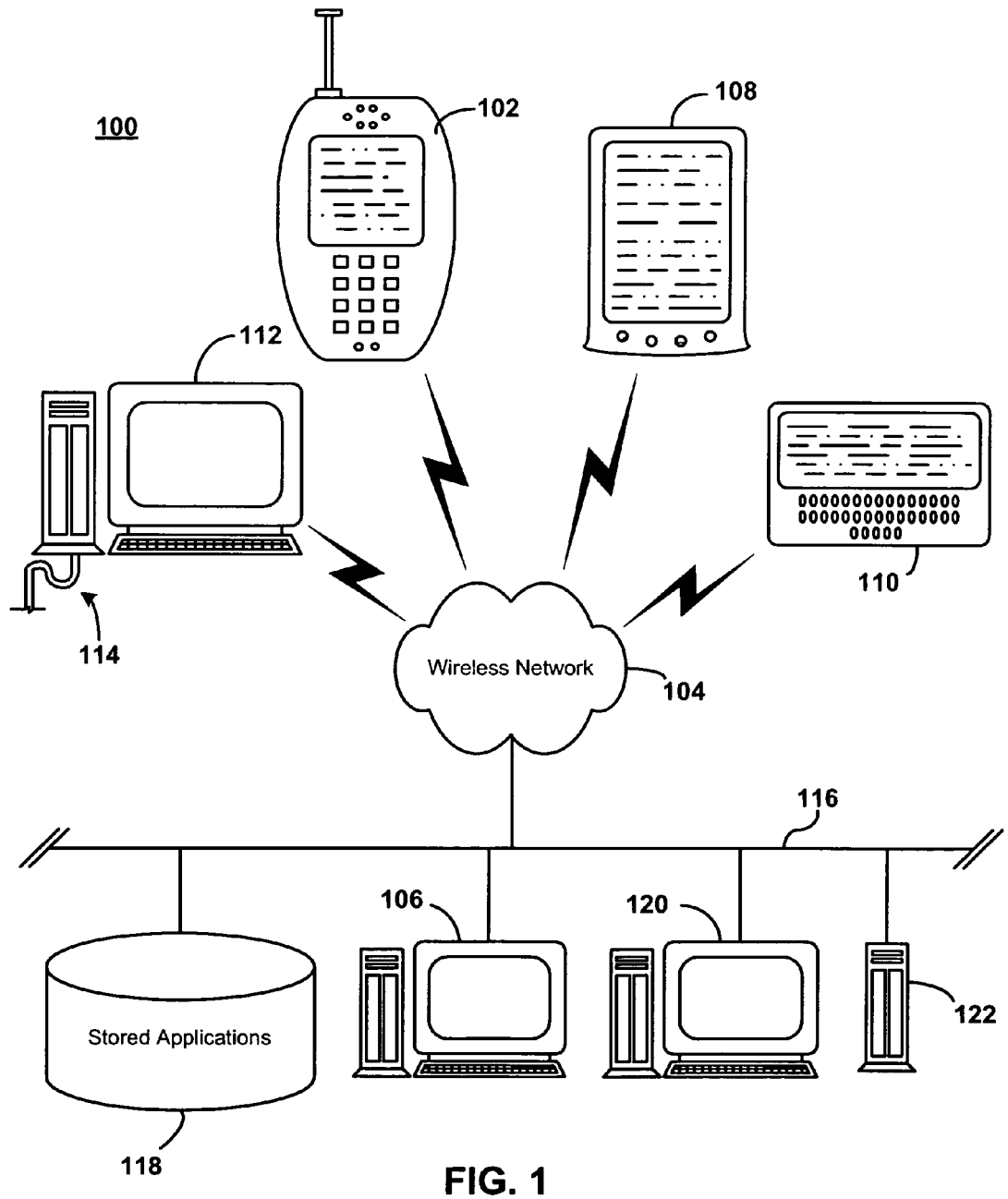
FIG. 1 is a general diagram of a particular embodiment of a system providing communications between a wireless device and a server.

FIG. 1 illustrates a block diagram of an exemplary, non-limiting embodiment of a system 100 that may perform loading, reloading, and deletion of software application components on a wireless device, such as wireless telephone 102. The wireless telephone 102 communicates across a wireless network 104 with at least one application server 106. Further, the application server 106 can selectively transmit one or more software applications and components to one or more wireless devices across a wireless communication portal or other node having data access to the wireless network 104.

As illustrated in FIG. 1, the wireless device can be a wireless telephone 102, a personal digital assistant 108, a pager 110, or a separate computer platform 112 that has a wireless communication portal. In a particular embodiment, the pager 110 can be a two-way text pager. Further, in an alternative embodiment, the wireless device can have a wired connection 114 to a network or the Internet. The exemplary, non-limiting system can include any form of a remote module including a wireless communication portal, including without limitation, wireless modems, PCMCIA cards, personal computers, access terminals, telephones with or without a display or keypad, or any combination or sub-combination thereof.

As depicted in FIG. 1, the application download server 106 is coupled to a network 116 with other computer elements in communication with the wireless network 104. The system 100 includes is a second server 120 and a stand-alone server 122, and each server can provide separate services and processes to the wireless devices 102, 108, 110, 112 across the wireless network 104. Further, as indicated in FIG. 1, the system 100 also includes at least one stored application database 118 that stores software applications that are downloadable by the wireless devices 102, 108, 110, 112. Different embodiments are contemplated that locate logic to perform secure communications at any one or more of the application download server 106, the second server 120 and the stand-alone server 122.

Figure 2:
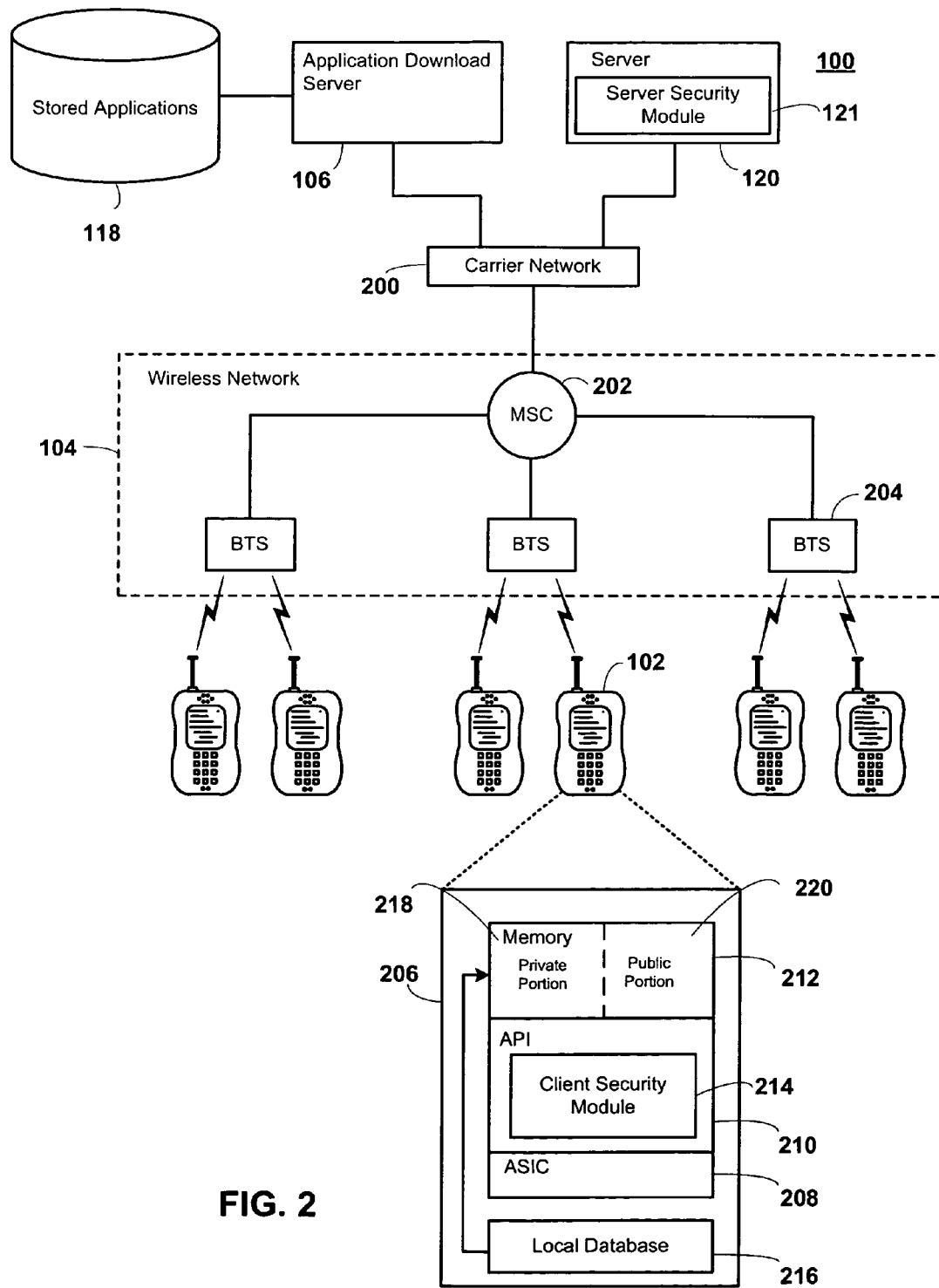
FIG. 2 is a general diagram that illustrates further details of the particular embodiment of the system of FIG. 1.

In FIG. 2, a block diagram is shown that more fully illustrates the system 100, including the components of the wireless network 104 and interrelation of the elements of the system 100. The system 100 is merely exemplary and can include any system whereby remote modules, such as the wireless devices 102, 108, 110, 112 communicate over-the-air between and among each other and/or between and among components connected via a wireless network 104, including, without limitation, wireless network carriers and/or servers. The application download server 106 and the stored application database 118, along with any other servers, such as server 120, are compatible with wireless communication services and can communicate with a carrier network 200 through a data link, such as the Internet, a secure LAN, WAN, or other network. In an illustrative embodiment, the server 120 contains a server security module 121 that further contains logic configured to provide for secure communications over the carrier network 200. In a particular embodiment, the server security module 121 can operate in conjunction with a client security module located on a wireless device, such as wireless devices 102, 108, 110, 112, to provide secure communications.

The carrier network 200 controls messages (sent as data packets) sent to a mobile switching center ("MSC") 202. The carrier network 200 communicates with the MSC 202 by a network, such as the Internet and/or POTS ("plain ordinary telephone system"). Typically, the network connection between the carrier network 200 and the MSC 202 transfers data, and the POTS transfers voice information. The MSC 202 is connected to multiple base transceiver stations ("BTS") 204. The MSC 202 can be connected to the BTS 204 by both a data network and/or Internet for data transfer and POTS for voice information. The BTS 204 ultimately broadcasts messages wirelessly to the wireless devices, such as to wireless telephone 102, by the short messaging service ("SMS"), or other over-the-air methods known in the art.

The wireless device 102 has a computer platform 206 that can receive and execute software applications transmitted from the application download server 106. The computer platform 206 may be implemented as an application-specific integrated circuit ("ASIC" 208), a processor, microprocessor, logic circuit, or other data processing device. The ASIC 208 is installed at the time of manufacture of the wireless device. The ASIC 208 or other processor can execute an application programming interface ("API") 210 layer that interfaces with resident programs in the memory 212 of the wireless device. The memory 212 can be comprised of read-only or random-access memory (ROM or RAM), EEPROM, flash memory, or any other memory suitable for computer platforms.

The API 210 also includes a client security module 214 containing logic configured to provide for secure communications over the carrier network 200. In a particular embodiment, the client security module 214 can operate in conjunction with the server security module 121 to provide secure communications. As illustrated in FIG. 2, the computer platform 206 can further include a local database 216 that can hold applications not actively used in memory 212. In an illustrative embodiment, the local database 216 is stored within a flash memory cell, but it can be stored within any secondary storage device as known in the art, such as magnetic media, EEPROM, optical media, tape, or floppy or hard disk.

A wireless device, e.g., the wireless telephone 102, can download one or more software applications, such as games, news, stock monitors, and the like, from the application download server 106. Further, the wireless device can store the downloaded applications in the local database 216, when not in use, and can load stored resident applications from the local database 216 to memory 212 for execution by the API 210 when desired by the user. Further, communications over the wireless network 104 may be performed in a secure manner, at least in part, due to the interaction and operation of the client security module 214 and the server security module 121.

As shown in FIG. 2, the memory 212 can be partitioned to include a private portion 218 and a public portion 220. In a particular embodiment, a virtual partition can be used to divide a single memory 212 into the private portion 218 and the public portion 220. Alternatively, the private portion 218 can be physically partitioned from the public portion 220, e.g., the private portion 218 and the public portion 220 can reside on separate memories. As shown in FIG. 2, the API 210 can interface with the private portion 218 of the memory 212 or the public portion of the memory 214.

Figure 3:
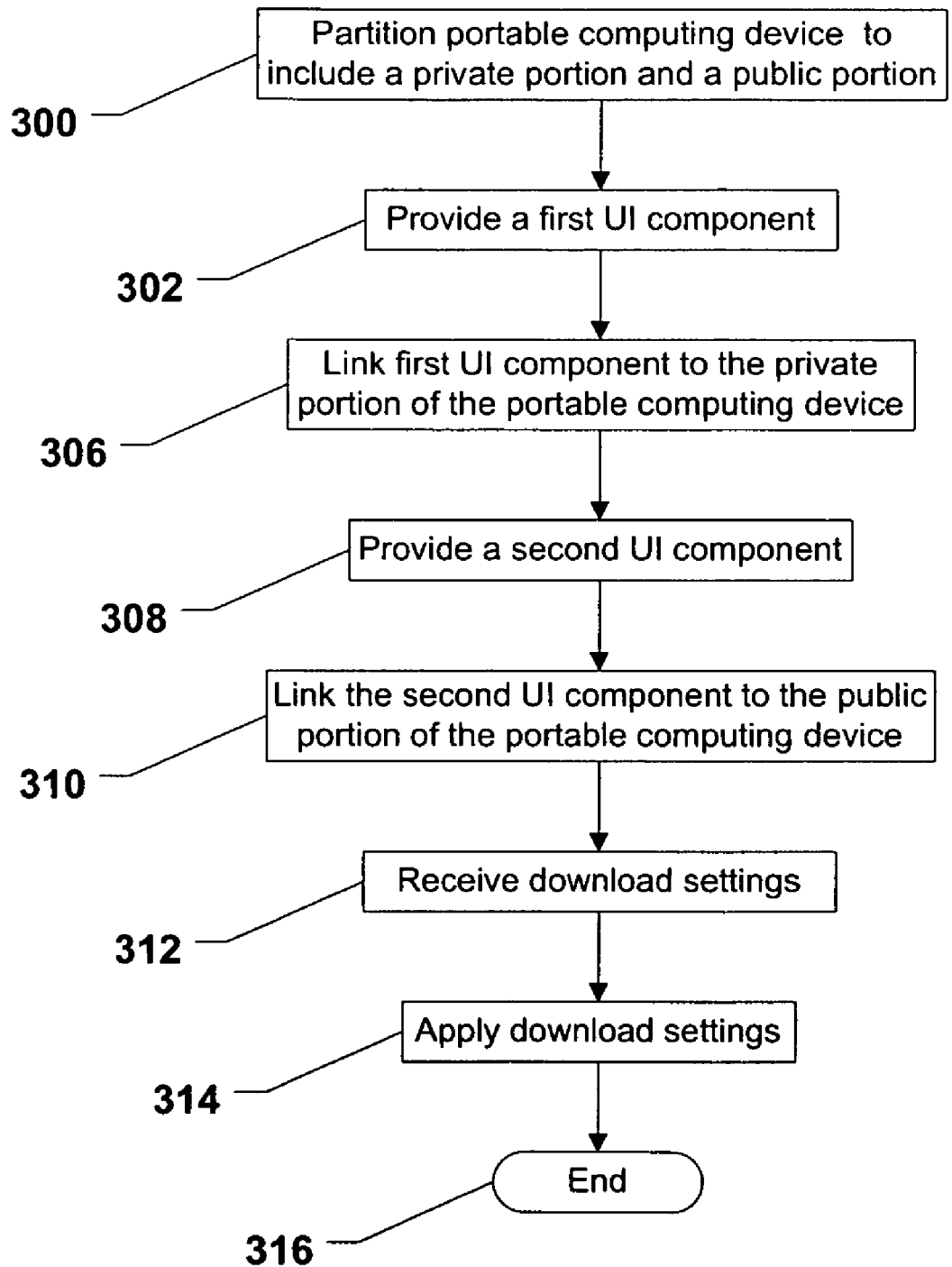
FIG. 3 is a flowchart illustrating a method of configuring a wireless device to include a private portion and a public portion.

Referring to FIG. 3, a method of configuring a wireless device is shown and commences at block 300. At block 300, the wireless device is partitioned to include a private portion and a public portion. Next, at block 302, a first user interface (UI) component is provided. The first UI component is linked to the private portion of the wireless device, at block 304. Moving to block 306, a second UI component is provided. At block 308, the second UI component is linked to the public portion of the wireless device. In an illustrative embodiment, each UI component is linked to its respective portion of the wireless device such that when a particular UI component is selected, e.g., the first UI component, the associated portion of the wireless device is accessed, e.g., the private portion of the wireless device.

Moving to block 310, one or more download settings are received. In a particular embodiment, the one or more download settings can include an indication as to where to store particular data files, i.e., in the public portion of the wireless device or the private portion of the wireless device, when data files are received at the wireless device. Proceeding to block 314, the download settings are applied to the wireless device, and the method then ends at state 316.

In an illustrative embodiment, the data files received by the wireless device can be audio data files, video data files, still image data files, user interface components, or other types of data files. Particularly, the still image data files can be joint photographic experts group (JPEG) data files, graphics interchange format (GIF) data files, tagged image data file format (TWIF) data files, Adobe Photoshop (PSD) data files, portable networks graphics (PNG) data files, windows metadata file (WMF) data files, or any other types of image data files that can be downloaded to and viewed at the wireless device.

Further, the video data files can be moving picture experts group (MPEG) data files, audio video interleave (AVI) data files, Windows media video (WMV) data files, advanced streaming format (ASF) data files, Quicktime (MOV) data files, Real Media (RM) data files, or any other type of video data files that can be downloaded to and viewed at wireless device. Also, the audio data files can be MPEG audio layer three (MP3) data files, waveform audio format (WAV) data files, windows media audio (WMA) data files, OGG data files, Monkey's Audio digital data files (APE) data file, VOX data files, Real Audio (RA) data files, synthetic music mobile application format (MMF) data files, musical instrument digital interface (MID) data files, phrase format (SPF) data files, Qualcomm PureVoice audio data files (QCP) or any other sound data files that can be listened to at the wireless device. The audio data files can also be used as ring tones for wireless telephone devices.

Additionally, a user interface component data file can include a graphical user interface component, such as a graphical icon, a virtual button, a skin, a background, a font package, or a graphical menu that is linked to a physical user interface component, such as a keypad button, a keyboard button, or a mouse. The user interface component data file can also be a collection of graphical user interface components, e.g., an entire graphical user interface. The user interface component data file can also be a graphical user interface component such as a touch screen component that can be selected by touching the display screen of the wireless device with a finger or a stylus. Also, the user interface component data file can be an entire touch screen user interface. Further, in another illustrative embodiment, the user interface component data file can be a voice user interface component, such as a voice command linked to a particular function, such as dialing a telephone number. Moreover, the user interface component data file can be an entire voice user interface having multiple voice commands and corresponding actions.

Figure 4:
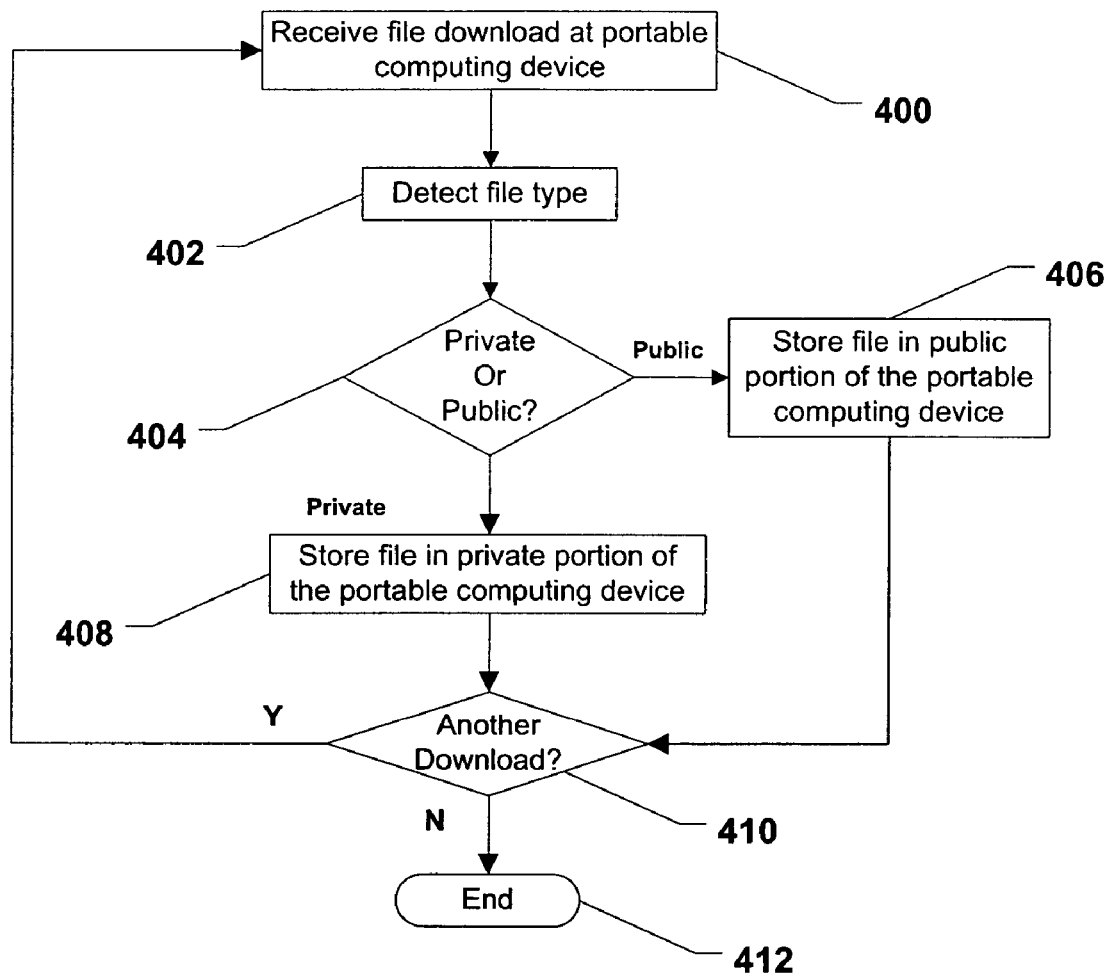
FIG. 4 is a flowchart illustrating a first method of storing data files at a wireless device.

Referring now to FIG. 4, a first method of storing data files at a wireless device is shown and begins at block 400 where the wireless device receives a data file download. At block 402, the wireless device detects a data file type associated with the data file download. Moving to decision step 404, the wireless device determines whether the data file should be stored in a private portion of a memory device or within a public portion of a memory device. The wireless device makes this determination based on the detected data file type and based on one or more user download settings that can be previously defined by a user of the wireless device. For example, a user can indicate that JPEG files received at the wireless device are to be stored in the public portion. On the other hand, the user can indicate that PDF files are to be stored in the private portion of the wireless device.

At decision step 404, if the wireless device determines that the data file should be stored in the public portion of the wireless device, the method moves to block 406 and the wireless device stores the data file in the public portion established therein. On the other hand, if the wireless device determines that the data file should be stored in the private portion of the wireless device, the method continues to block 408 and the wireless device stores the data file in the private portion therein. As shown in FIG. 4, from block 406 and block 408, the method proceeds to decision step 410, and the wireless device determines whether another data file download has been initiated by the user. If another data file download is initiated by the user, the method returns to block 400 and continues as described. If another data file download is not initiated by the user, the method ends at state 412.

Figure 5:
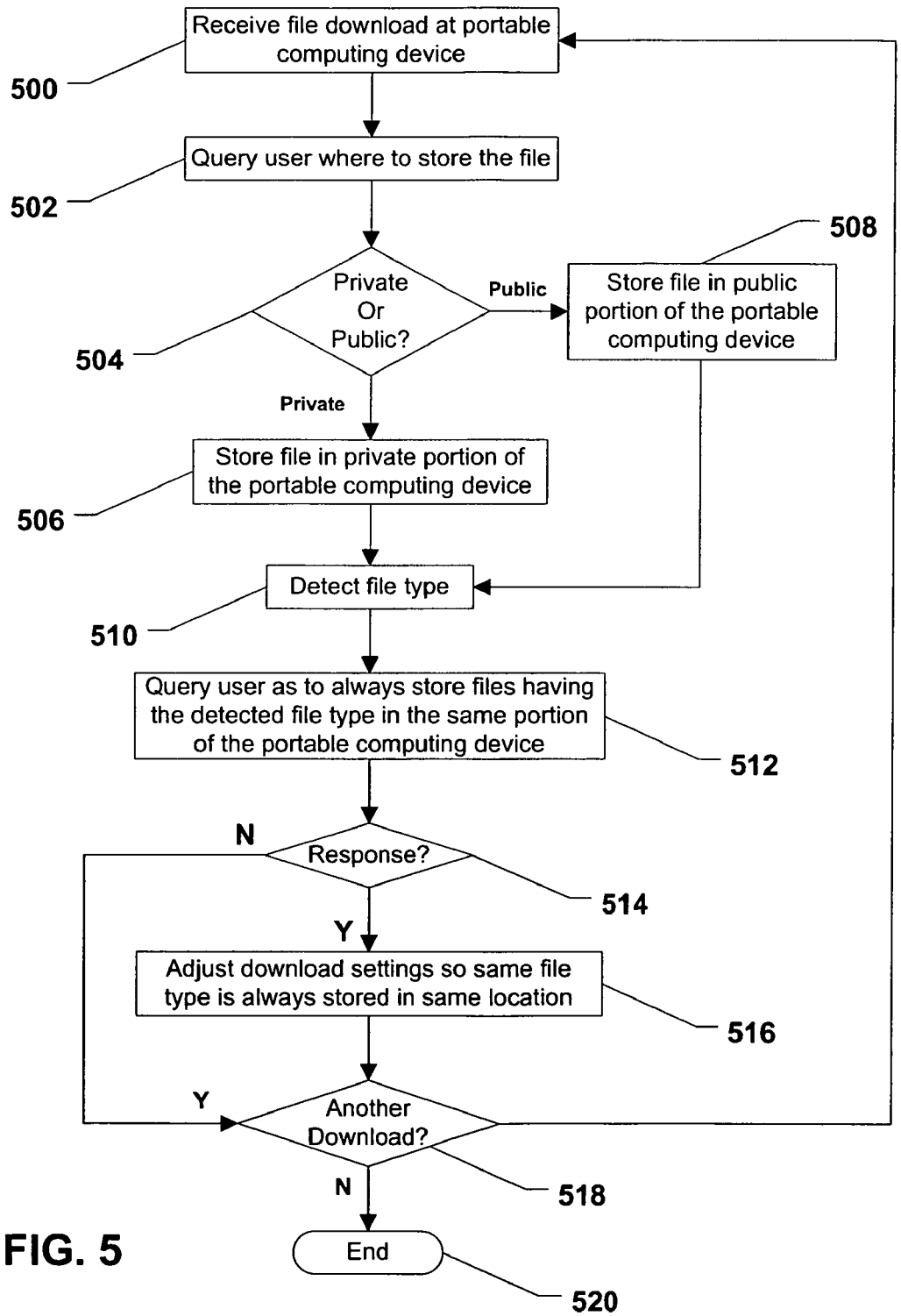
FIG. 5 is a flowchart illustrating a second method of storing data files at a wireless device.

Referring to FIG. 5, a second method of storing data files at a wireless device is shown and starts at block 500 where the wireless device receives a data file download. At block 502, the wireless device queries a user as to where the data file should be stored, i.e., in the private portion or public portion of the wireless device. In a particular embodiment, the wireless device queries the user via a graphical user interface (GUI) and the user can response using a physical user interface (PUI). For example, a message screen can be presented a display of the portable computer device asking where the data file should be stored in the wireless device. The user can answer by pressing a button on a keypad at the wireless device that corresponds to storing the data file in the private portion or by pressing a button that corresponds to storing the data file in the public portion.

In the case of a touch screen user interface, a user can be presented with a first selection area at the display that corresponds to storing the data file in the private area and a second selection area that corresponds to storing the data file in the public area. The user can select where to store the data file by touching the first selection area or the second selection area. Additionally, in the case of a voice user interface (VUI), the wireless device can play an audio data file that asks the using whether he or she wants to store the data file in the private portion or the public portion of the wireless device. The user can speak a response to the wireless device indicating where to store the data file.

Proceeding to decision step 504, the wireless device determines whether the data file should be stored in the private portion of the memory device or within the public portion of the memory device based on the use response. If the wireless device detects that the data file should be stored in the public portion of the wireless device, the method moves to block 506 and the wireless device stores the data file in the public portion. On the other hand, if the wireless device detects that the data file should be stored in the private portion of the wireless device, the method continues to block 508 and the wireless device stores the data file in the private portion therein.

As illustrated in FIG. 5, from block 506 and block 508, the method proceeds to block 510 and the wireless devices detects the data file type associated with the downloaded data file. Moving to block 512, the wireless device queries the user as to whether the user would like future downloaded data files of the same type to be stored in the private portion or public portion, previously selected. At decision step 514, the portable computing detects a response to the query. If the user wants to store all data files of the detected type at the selected private or public portion, the method moves to block 516 and the wireless device adjusts the data file download settings so that future data files of the detected type are stored in the same location, i.e., the public portion or the public portion. The method then proceeds to decision step 518.

Returning to decision step 514, if the user does not want all data files of this type to be stored as previously indicated, the method proceeds to decision step 518. At decision step 518, the wireless device determines whether another download has been initiated by the user. If another download is initiated by the user, the method returns to block 500 and continues as described above. If another download is not initiated by the user, the method ends at state 520. In an alternative embodiment, other factors in addition to file type can be used to determine where to store data files. These other factors, for example, can include file source, time of installation, data file developer, etc.

Figure 6:
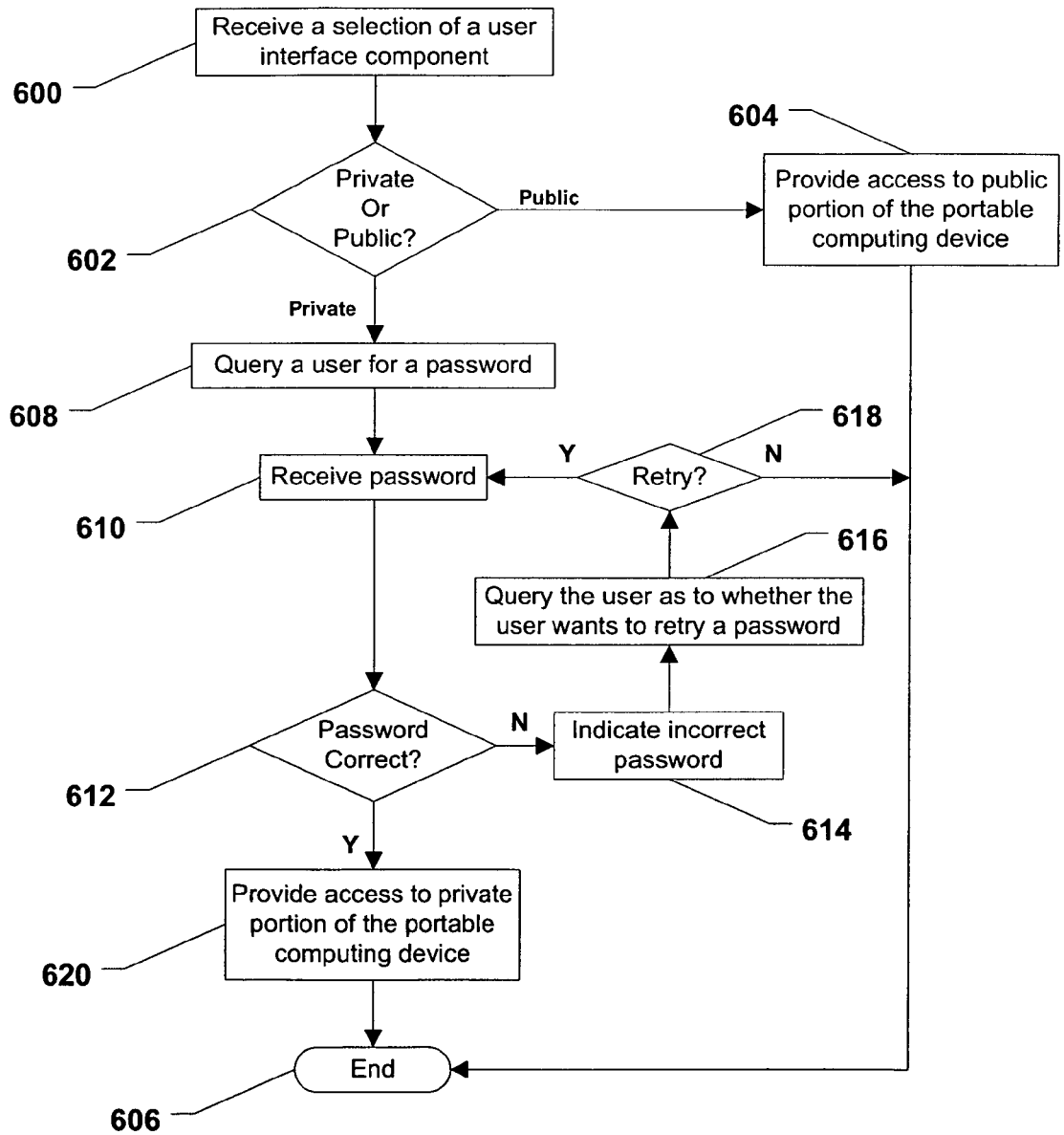
FIG. 6 is a flowchart illustrating a method of accessing data files at a wireless device.

Referring to FIG. 6, a method of accessing data files previously stored at a wireless device is shown and commences at block 600. At block 600, the wireless device receives a user interface component selection. In a particular embodiment, the user interface component selection is performed by a particular keypress sequence at a keypad of the wireless device in one or more context specific areas of the user interface of the wireless device. Particularly, the keypress sequence can be a press and hold sequence or a rapid double press sequence. Moving to decision step 602, the wireless device determines whether the selected user interface component is linked to a private portion of the wireless device or linked to a public portion of the wireless device. If the selected user interface component is linked to the public portion of the wireless device, the method proceeds to block 604 and the wireless device provides access to the public portion of the wireless device. As such, public files and public application stored within the public portion of the wireless device can be accessed. Public applications, for example, can include web browsers, email programs, calculator programs, etc. The logic then ends at state 606.

Returning to decision step 602, if the selected user interface component is linked to the private portion of the wireless device, the logic proceeds to block 608 and a user is queried for a password. In a particular embodiment, the user is queried for a password via a GUI. Alternatively, the user can be queried via a VUI. Moving to block 610, a password is received by the wireless device. Thereafter, at decision step 612, the wireless device determines whether the password is correct. If the password is not correct, the method moves to block 614 and the wireless device indicates to the user that the password is incorrect 614. In an illustrative embodiment, the wireless device indicates an incorrect password via a GUI or a VUI.

Continuing to block 616, the wireless device queries the user as to whether he or she would like to retry a password. Next, at decision step 618, the wireless device detects a response. If the user wants to retry a password, the method returns to block 610 and proceeds as described above. If the user does not want to retry a password, the method ends at state 606. Returning to decision step 612, if the password is correct, the method proceeds to block 620 and the wireless device provides access to the private portion of the wireless device and any data files or applications stored within the private portion. Private applications, for example, can include one or more games that the owner of the wireless device does not want others to play, e.g., a game with cumulative tasks. The logic then ends at state 606.

Figure 7:
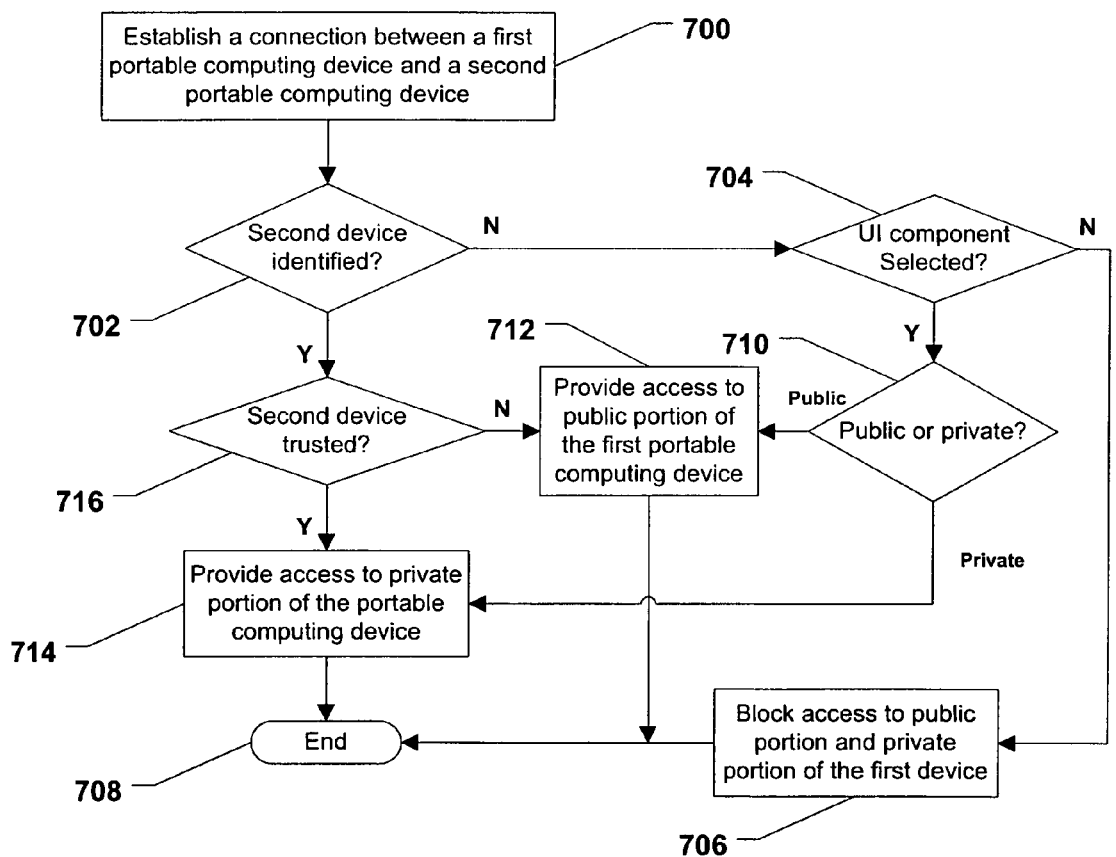
FIG. 7 is a flowchart illustrating a method of communicating between two wireless devices.

Referring now to FIG. 7, a method of communicating between two wireless devices is shown and commences at block 700 wherein a first wireless device establishes a connection with a second wireless device. In a particular embodiment, the connection is established via an over the air interface. At decision step 702, the first wireless device determines whether the second wireless device is an identified device. In a particular embodiment, the second wireless device may be identified based on the telephone number of the second device. For example, if the second wireless device has an unlisted telephone number, calls received therefrom will be unidentified. However, the second wireless device may be identified when called, if the number is stored within the first wireless device. Further, the second wireless device is determined to be trusted or not trusted also based on the telephone number of the second device. For example, a user can mark particular telephone numbers as trusted in a directory of telephone numbers stored at the first wireless device. Moving to decision step 704, where the second device is not identified, the first wireless device determines whether a user interface component corresponding to a private portion or public portion of the first wireless device is selected by a user. If a user interface component is not selected at the first wireless device, the method moves to block 706 and the first wireless device blocks access to the public portion and the private portion of the first wireless device. The logic then ends at state 708.

Returning to decision step 704, if a user interface component is selected at the first wireless device, the logic continues to decision step 710 and the first wireless device determines whether the selected user interface component is linked to a public portion or private portion of the first wireless device. If the selected user interface component is linked to a public portion, the method moves to block 712 and the first wireless device provides access to the public portion of the first wireless device. The logic then ends at state 708. At decision step 710, if the selected user interface component is linked to a private portion, the method moves to block 714 and the first wireless device provides access to the private portion of the first wireless device. The method then ends at state 708. In a particular embodiment, a password can be required to access the private portion.

Returning to decision step 702, if the second device is identified, the method proceeds to decision step 716 and the first wireless device determines whether the second wireless device is trusted. If the second wireless device is not trusted, the method moves to block 712 and the first wireless device provides access to the public portion of the first wireless device. Then, the method ends at state 708. At decision step 716, if the second wireless device is trusted, the method continues to block 714 and the first wireless device provides access to the private portion of the first wireless device. Thereafter, the method ends at state 708.

Accordingly, when a connection is established between the first wireless device and a second wireless device, the user of the first wireless device can put the first wireless device in a private mode in which access to the private portion of the first wireless device is provided to the second wireless device. Alternatively, the user can put the first wireless device in a public mode in which access to the public portion of the first wireless device is provided to the second wireless device. A user at the second wireless device can browse files with the public portion or private portion of the first wireless device and download files from the public portion or private portion of the first wireless device to the second wireless device.

Figure 8:
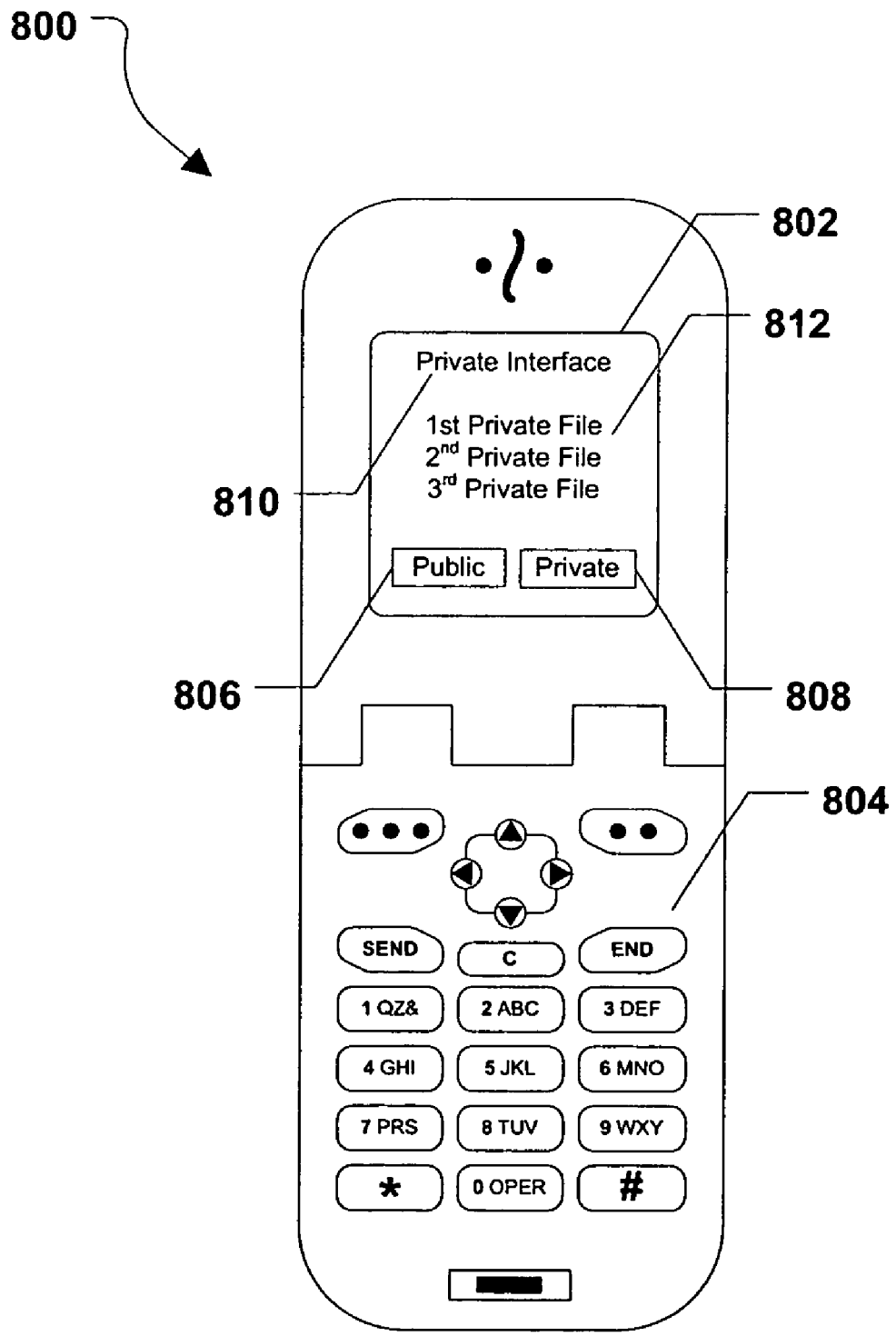
FIG. 8 is a diagram of a wireless device showing a first user interface.
Figure 9:
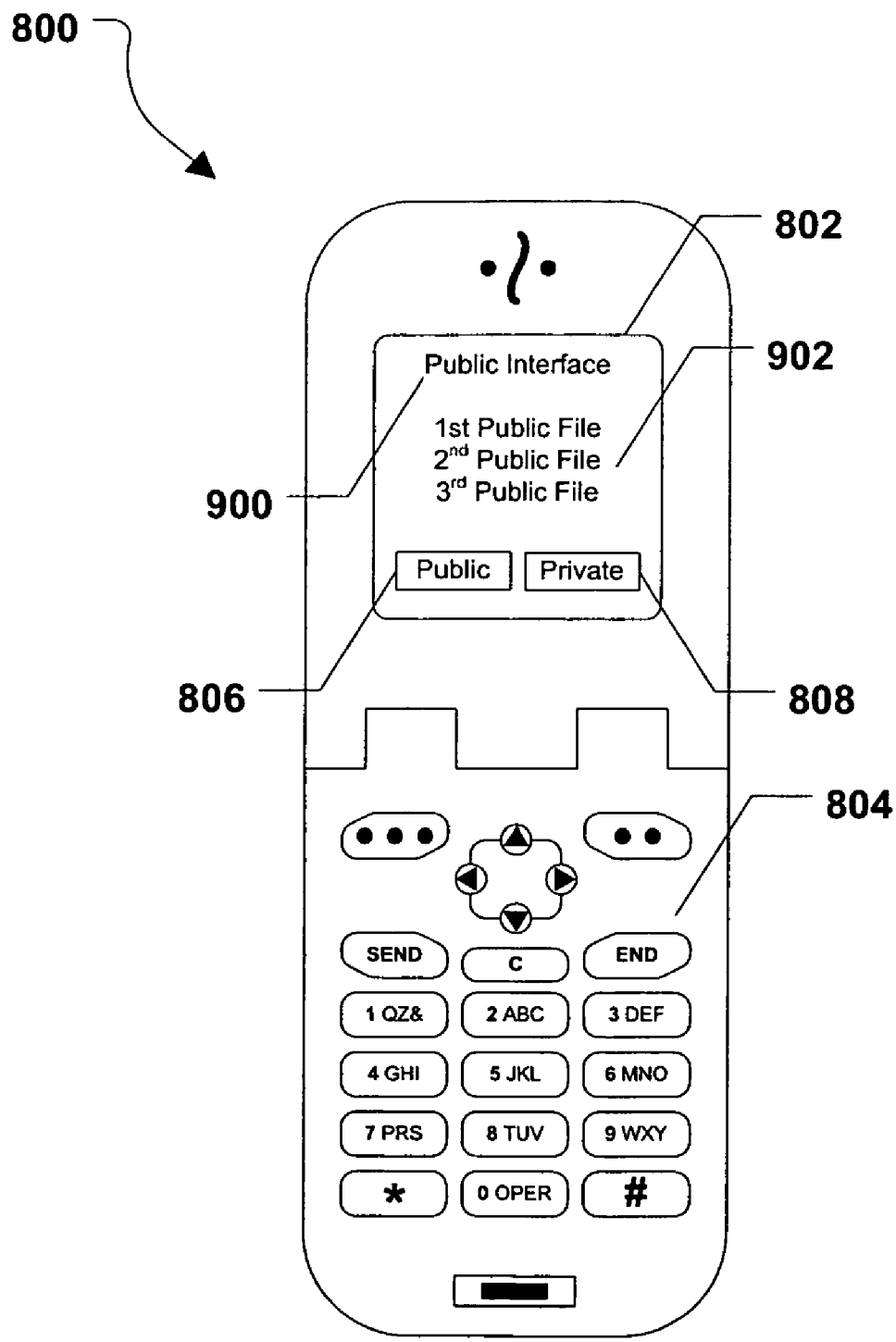
FIG. 9 is a diagram of a wireless device showing a second user interface.

Referring now to FIG. 8, a wireless device is shown and is generally designated 800. As shown, the wireless device includes a display 802 and a keypad 804. A "public" soft button 806 and a "private" soft button 808 can be presented to the user via the display 802. When the "private" soft button 808 is selected a private user interface 810 can be presented to the user. The private user interface 810 provides access to the private portion of the wireless device 800 and can include a menu of private files 812. As such, a user can select the "private" soft button 808 and then, access any private files listed in the private files menu 812.

Further, when the "public" soft button 806 is selected a public user interface 900 can be presented to the user. The public user interface 900 provides access to the public portion of the wireless device 800 and can include a menu of public files 902. As such, a user can select the "public" soft button 806 and then, access any public files listed in the public files menu 812. In a particular embodiment, the user use the keypad 804 to select the soft buttons 806, 808 in order to navigate between the private user interface 810 and the public user interface 900.

With the configuration of structure disclosed herein, the system and method can allow a user to place a wireless device in a private mode in which private data files, stored within a private portion of the wireless device, can be shared with a trusted user or another trusted wireless device. Further, the system and method described herein can allow a user place a wireless device in a public mode in which public data files, stored within a public portion of the wireless device, can be shared with any other user or wireless device. Also, a user can quickly navigate between a public portion of the wireless device and a private portion of the wireless device using a user interface. In an alternative embodiment, the system and method can provide multiple grouping types in addition to private and public. For example, the groupings can be audience or purpose specific. Further, the system and method can provide for multiple privacy levels, which would result in multiple groupings.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device or a user terminal. In the alternative, the processor and the storage medium may reside as discrete components in a wireless device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of providing access to data files within a wireless device comprising a memory partitioned to include a private portion and a public portion, a first user interface component linked to the private portion of memory on the wireless device, and a second user interface component linked to the public portion of memory on the wireless device, the method comprising:
    detecting a selection of the first user interface component and accessing the private portion of the memory of the wireless device when the first user interface component is selected and
    detecting a selection of the second user interface component and accessing the public portion of the memory of the wireless device when the second user interface component is selected.

2. The method of claim 1, wherein the wireless device includes a keypad and the first user interface component or the second user interface component is selected using a press and hold keypress sequence on the keypad.

3. The method of claim 1, wherein the wireless device includes a keypad and the first user interface component or the second user interface component is selected using a rapid double keypress sequence.

4. The method of claim 1, further comprising:
    prompting a user for a password after the first user interface component is selected;
    receiving a password from the user; and
    providing access to the private portion of the wireless device after a correct password is received.

5. The method of claim 4, further comprising providing access to one or more private data files stored within the private portion of the wireless device.

6. The method of claim 5, further comprising providing access to one or more private applications stored within the private portion of the wireless device.

7. The method of claim 6, further comprising providing access to one or more public data files stored within the public portion of the wireless device.

8. The method of claim 7, further comprising providing access to one or more public applications stored within the public portion of the wireless device.

9. The method of claim 7, wherein the public data file, the private data file, or both the public data file and the private data file is an audio data file, a video data file, or a still image data file.

10. The method of claim 9, wherein the audio data file is an MPEG audio layer three (MP3) data file, a waveform audio format (WAV) data file, a wma data file, an OGG data file, a Monkey's Audio digital data file (APE) data file, a VOX data file, a Real Audio (RA) data file, a synthetic music mobile application format (MMF) data file, or musical instrument digital interface (MID) data file, a phrase format (SPF) data file, or a Qualcomm PureVoice audio data file (QCP).

11. The method of claim 9, wherein video data file is a moving picture experts group (MPEG) data file, an audio video interleave (AVI) data file, a Windows media video (WMV) data file, an advanced streaming format (ASF) data file, a Quicktime (MOV) data file, or a Real Media (RM) data file.

12. The method of claim 9, wherein the image data file is a joint photographic experts group (JPEG) data file, a graphics interchange format (GIF) data file, a tagged image data file format (TIFF) data file, an Adobe Photoshop (PSD) data file, a portable networks graphics (PNG) data file, or a windows metadata file (WMF) data file.

13. The method of claim 1, wherein the first user interface component is a voice user interface component, a physical user interface component, a graphical user interface component, or a touch screen user interface component.

14. The method of claim 1, wherein the second user interface component is a voice user interface component, a physical user interface component, a graphical user interface component, or a touch screen user interface component.

15. The method of claim 1, wherein the wireless device is selected from the group consisting of a wireless telephone, a portable digital assistant, and a pager.

16. A wireless device, comprising:
    a processor;
    a memory device accessible by the processor, wherein the memory device includes a private portion and a public portion;
    a first user interface component on the wireless device associated with obtaining access to the private portion; and
    a second user interface component on the wireless device associated with obtaining access to the public portion,
    wherein the processor is configured to perform steps comprising:
        accessing the private portion of the memory on the wireless device when the first user interface component is selected; and
        accessing the public portion of the memory on the wireless device when the second user interface component is selected.

17. The wireless device of claim 16, further comprising:
    a keypad, wherein the first user interface component or the second user interface component is selected using a press and hold keypress sequence on the keypad.

18. The wireless device of claim 16, further comprising:
    a keypad, wherein the first user interface component or the second user interface component is selected using a rapid double keypress sequence.

19. The wireless device of claim 16, wherein the processor is configured to perform steps comprising:
    prompting a user for a password after the first user interface component is selected;
    receiving a password from the user; and
    providing access to the private portion of the wireless device after a correct password is received.

20. The wireless device of claim 19, wherein the processor is configured to perform steps further comprising:
    providing access to one or more private data files stored within the private portion of the wireless device.

21. The wireless device of claim 20, wherein the processor is configured to perform steps further comprising:
    providing access to one or more private applications stored within the private portion of the wireless device.

22. The wireless device of claim 21, wherein the processor is configured to perform steps further comprising:
    providing access to one or more public data files stored within the public portion of the wireless device.

23. The wireless device of claim 22, wherein the processor is configured to perform steps further comprising:
    providing access to one or more public applications stored within the public portion of the wireless device.

24. The wireless device of claim 23, wherein the public data file, the private data file, or both the public data file and the private data file is an audio data file, a video data file, or a still image data file.

25. The wireless device of claim 24, wherein the audio data file is an MPEG audio layer three (MP3) data file, a waveform audio format (WAV) data file, a wma data file, an OGG data file, a Monkey's Audio digital data file (APE) data file, a VOX data file, a Real Audio (RA) data file, a synthetic music mobile application format (MMF) data file, or musical instrument digital interface (MID) data file, a phrase format (SPF) data file, or a Qualcomm PureVoice audio data file (QCP).

26. The wireless device of claim 24, wherein video data file is a moving picture experts group (MPEG) data file, an audio video interleave (AVI) data file, a Windows media video (WMV) data file, an advanced streaming format (ASF) data file, a Quicktime (MOV) data file, or a Real Media (RM) data file.

27. The wireless device of claim 24, wherein the image data file is a joint photographic experts group (JPEG) data file, a graphics interchange format (GIF) data file, a tagged image data file format (TIFF) data file, an Adobe Photoshop (PSD) data file, a portable networks graphics (PNG) data file, or a windows metadata file (WMF) data file.

28. The wireless device of claim 16, wherein the first user interface component is a voice user interface component, a physical user interface component, a graphical user interface component, or a touch screen user interface component.

29. The wireless device of claim 16, wherein the second user interface component is a voice user interface component, a physical user interface component, a graphical user interface component, or a touch screen user interface component.

30. The wireless device of claim 16, wherein the wireless device is selected from the group consisting of a wireless telephone, a portable digital assistant, and a pager.

31. A non-transitory computer readable medium having stored thereon a computer program, the computer program comprising:
    instructions executable on a wireless device to generate a first user interface component on a display of the wireless device, wherein the first user interface component is associated with a private portion of a memory on the wireless device;
    instructions executable on the wireless device to generate a second user interface component on the display of the wireless device, wherein the second user interface component is associated with a public portion of the memory on the wireless device;
    instructions executable on the wireless device to navigate from the public portion of the memory on the wireless device to the private portion of the wireless device and provide access to the private portion of the memory on the wireless device in response to a selection of the first user interface component; and
    instructions executable on the wireless device to navigate from the private portion of the memory on the wireless device to the public portion of the wireless device and provide access to the public portion of the memory on the wireless device in response to a selection of the second user interface component.

32. The non-transitory computer readable medium of claim 31, the stored computer program further comprising:
    instructions to prompt a user for a password after the first user interface component is selected;
    instructions to receive a password from the user; and
    instructions to provide access to the private portion of the wireless device after a correct password is received.

33. The non-transitory computer readable medium of claim 32, the stored computer program further comprising:
    instructions to provide access to one or more private data files stored within the private portion of the wireless device.

34. The non-transitory computer readable medium of claim 33, the stored computer program further comprising:
    instructions to provide access to one or more private applications stored within the private portion of the wireless device.

35. The non-transitory computer readable medium of claim 34, the stored computer program further comprising:
    instructions to provide access to one or more public data files stored within the public portion of the wireless device.

36. The non-transitory computer readable medium of claim 35, the stored computer program further comprising:
    instructions to provide access to one or more public applications stored within the public portion of the wireless device.

37. A wireless device, comprising:
    a processor;
    a memory device accessible by the processor, wherein the memory device includes a private portion and a public portion; and
    a computer program embedded within the memory device, the computer program comprising:
        instructions to generate a first user interface component on the wireless device, wherein the first user interface component is linked to a private portion of the memory on the wireless device;
        instructions to generate a second user interface component on the wireless device, wherein the second user interface component is linked to a public portion of the memory on the wireless device;
        instructions to navigate from the public portion of the memory on the wireless device to the private portion of the memory on the wireless device and provide access to the private portion of the memory on the wireless device when the first user interface component is selected; and
        instructions to navigate from the private portion of the memory on the wireless device to the public portion of the wireless device and provide access to the public portion of the memory on the wireless device when the second user interface component is selected.

38. A wireless device, comprising:
    means for partitioning memory on the wireless device to include a private portion and a public portion;
    means for linking a first user interface component on the wireless device to the private portion of memory on the wireless device;
    means for linking a second user interface component on the wireless device to the public portion of memory on the wireless device;
    means for detecting a selection of the first user interface component and accessing the private portion of the memory on the wireless device when the first user interface component is selected; and
    means for detecting a selection of the second user interface component and accessing the public portion of the memory on the wireless device when the second user interface component is selected.

39. The wireless device of claim 38, further comprising:
    a keypad, wherein the first user interface component or the second user interface component is selected using a press and hold keypress sequence on the keypad.

40. The wireless device of claim 38, further comprising:
    a keypad, wherein the first user interface component or the second user interface component is selected using a rapid double keypress sequence.

41. The wireless device of claim 38, further comprising:
    means for prompting a user for a password after the first user interface component is selected;

means for receiving a password from the user; and means for providing access to the private portion of the wireless device after a correct password is received.

42. The wireless device of claim 41, further comprising means for providing access to one or more private data files stored within the private portion of the wireless device.

43. The wireless device of claim 42, further comprising means for providing access to one or more private applications stored within the private portion of the wireless device.

44. The wireless device of claim 43, further comprising means for providing access to one or more public data files stored within the public portion of the wireless device.

45. The wireless device of claim 44, further comprising means for providing access to one or more public applications stored within the public portion of the wireless device.

46. The wireless device of claim 45, wherein the public data file, the private data file, or both the public data file and the private data file is an audio data file, a video data file, or a still image data file.

47. The wireless device of claim 46, wherein the audio data file is an MPEG audio layer three (MP3) data file, a waveform audio format (WAV) data file, a wma data file, an OGG data file, a Monkey's Audio digital data file (APE) data file, a VOX data file, a Real Audio (RA) data file, a synthetic music mobile application format (MMF) data file, or musical instrument digital interface (MID) data file, a phrase format (SPF) data file, or a Qualcomm PureVoice audio data file (QCP).

48. The wireless device of claim 46, wherein video data file is a moving picture experts group (MPEG) data file, an audio video interleave (AVI) data file, a Windows media video (WMV) data file, an advanced streaming format (ASF) data file, a Quicktime (MOV) data file, or a Real Media (RM) data file.

49. The wireless device of claim 46, wherein the image data file is a joint photographic experts group (JPEG) data file, a graphics interchange format (GIF) data file, a tagged image data file format (TIFF) data file, an Adobe Photoshop (PSD) data file, a portable networks graphics (PNG) data file, or a windows metadata file (WMF) data file.

50. The wireless device of claim 38, wherein the first user interface component is a voice user interface component, a physical user interface component, a graphical user interface component, or a touch screen user interface component.

51. The wireless device of claim 38, wherein the second user interface component is a voice user interface component, a physical user interface component, a graphical user interface component, or a touch screen user interface component.

52. The wireless device of claim 38, wherein the wireless device is selected from the group consisting of a wireless telephone, a portable digital assistant, and a pager.

* * * * *